(12) United States Patent
Haugen (10) Patent No.: US 6,230,817 B1
(45) Date of Patent: May 15, 2001

(54) HITCH ASSEMBLY FOR A WORK VEHICLE (75) Inventor: Larry R. Haugen, Fargo, ND (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/371,479

(22) Filed: Aug. 10, 1999

(51) Int. Cl.[7] .................................................. A01B 63/112
(52) U.S. Cl. .................................. 172/7; 172/439; 701/50
(58) Field of Search .................................. 172/439, 2, 4, 172/7; 701/50

(56) References Cited

U.S. PATENT DOCUMENTS

| 3,374,842 | 3/1968 | Smith, Jr. ............................ 172/7 |
| 3,516,498 | 6/1970 | Schowalter .......................... 172/9 |
| 3,731,746 | 5/1973 | Walberg ............................... 172/9 |
| 3,750,757 | * 8/1973 | Saetti ............................ 172/439 X |
| 3,795,415 | * 3/1974 | Koch et al. .................... 172/439 X |
| 4,064,945 | 12/1977 | Haney ................................ 172/7 X |
| 4,125,271 | * 11/1978 | Wiboltt et al. ................. 172/439 X |
| 4,194,757 | * 3/1980 | Lucas et al. ....................... 172/439 |
| 4,343,365 | 8/1982 | Rajagopal et al. ................. 172/7 X |
| 4,508,176 | 4/1985 | Wiegardt et al. ..................... 172/7 |
| 4,681,336 | * 7/1987 | Kryscyk ....................... 172/439 X |
| 4,931,967 | 6/1990 | Boe et al. ......................... 172/7 X |
| 4,969,527 | 11/1990 | Boe et al. ........................... 172/7 |
| 5,682,954 | 11/1997 | Burns ................................. 172/7 |
| 5,810,095 | * 9/1998 | Orbach et al. ....................... 172/2 |
| 6,089,328 | * 7/2000 | Moore et al. ................... 172/439 X |
| 6,105,679 | * 8/2000 | Schubert et al. ..................... 172/4 |

* cited by examiner

*Primary Examiner*—Christopher J. Novosad
(74) *Attorney, Agent, or Firm*—Foley & Lardner (57) ABSTRACT

A hitch assembly for a work vehicle includes a first draft link adapted to be pivotably coupled to the work vehicle, a second draft link adapted to be pivotably coupled to the work vehicle, a first linear actuator having a first end adapted to be pivotably coupled to the vehicle and a second end pivotably coupled to the first draft link and a linear member having a third end adapted to be pivotably coupled to the work vehicle and a fourth end pivotably coupled to the second draft link. The first and second draft links are pivotable relative to one another. The first linear actuator is actuatable to different lengths to pivot the first draft link relative to the linear member. In one exemplary embodiment, the linear member comprises a second linear actuator. The hitch assembly additionally includes a first sensor configured to generate a first signal indicative of the position of the first linear actuator, a second sensor configured to generate a second signal indicate of a position of the second linear actuator and a control circuit coupled to the first and second sensors and configured to generate a control signal in response to the first and second signals, wherein at least one of the first and second actuators actuates in response to the control signal.

23 Claims, 4 Drawing Sheets

HITCH ASSEMBLY FOR A WORK VEHICLE

FIELD OF THE INVENTION

The present invention relates to work vehicle hitches including lower draft links. In particular, the present invention relates to mechanisms for adjusting the angular orientation of one draft link relative to the other draft link.

BACKGROUND OF THE INVENTION

Three-point hitches are used at the rear and at the front of work vehicles to lift, carry, push and pull various implements. Three-point hitches typically include a rocker or rocker shaft, lift links, lower or draft links, an upper or center link and rocker shaft actuators. The rocker shaft is pivotally supported by the work vehicle and includes links pivotably connected to the lift links.

The rocker shaft provides synchronized lifting of the draft links and sums the lift forces of the hydraulic lift cylinders to maintain the implement in a stable roll axis while in use or at rest. The lift links extend from the arms of the rocker shaft and are pivotably connected to the draft links. The draft links are themselves pivotably connected to the work vehicle. The actuators are pivotably coupled at one end to the work vehicle and at an opposite end to the rocker shaft to pivotably raise and lower the rocker arms. Because the arms of the rocker shaft are coupled to the lift links and thereby to the draft links, such pivotal raising and lowering of the rocker shaft arms correspondingly pivotably raises and lowers the draft links to thereby lift and lower implements mounted on the draft links.

To attach the three-point hitch to a three-point hitch implement, it is necessary to align the draft links with corresponding attachment points on the implement. However, the attachment points on the three-point hitch implement are frequently out of alignment due to the implement being parked on uneven ground or on soft ground which allows the implement to repose into an unlevel misaligned condition. As a result, the operator must realign the draft links with the attachment points of the implement.

To enable the draft links to be realigned with the attachment points of the implement, conventional lift links include mechanical length adjustment features such as turn buckles. These turn buckles enable the operator to vary the length of the lift links so as to align the end of the lift links with the attachment points of the implement.

Although commonly used in both front and rear mounted three-point hitches, the use of such turn buckles to adjust the length of the lift links and to thereby align the draft links with the implement attachment points has several drawbacks. First, adjusting such turn buckles requires that the operator stop and exit the work vehicle to access the turn buckles at the rear of the work vehicle. Second, adjustment of the turn buckles is often extremely difficult and requires additional tools. Because turn buckles typically include threaded parts, the threaded parts frequently accumulate dust, rust or other contaminants upon them making adjustment of the turn buckle difficult.

Furthermore, adjustment of the lift links, once attached to the implement, is also inconvenient and time consuming. In many situations, it is also necessary to level the draft links once they are attached to the implement due to the large loads placed upon the lift links. As a result, the operator frequently must lower the implement to reduce loads upon the lift link in order to manually adjust the turn buckle and the length of the lift link. Consequently, the operator must climb into and out of the work vehicle multiple times.

Thus, there is a continuing need for a draft link adjustment mechanism which provides for easy and inexpensive adjustment of draft links for attachment to an implement and leveling of the draft links after attachment to an implement.

SUMMARY OF THE INVENTION

According to one exemplary embodiment, the present invention provides a hitch assembly for a work vehicle. The hitch assembly includes a first draft link adapted to be pivotably coupled to the work vehicle, a second draft link adapted to be pivotably coupled to the work vehicle, a first linear actuator having a first end adapted to be pivotably coupled to the vehicle and a second end pivotably coupled to the first draft link, and a linear member having a third end adapted to be pivotably coupled to the work vehicle and a fourth end pivotably coupled to the second draft link. The first and second draft links are pivotable relative to one another. The first linear actuator is actuatable to different lengths to pivot the first draft link relative to the linear member.

According to a second embodiment, the present invention provides a hitch assembly for a work vehicle which includes a frame adapted to be stationarily coupled to the work vehicle, a first draft link adapted to be pivotably coupled to the work vehicle, a second draft link adapted to be pivotably coupled to the work vehicle, a first linear actuator having a first end adapted to be pivotably coupled to the frame and a second end pivotably coupled to the first draft link, and a second linear actuator having a third end pivotably coupled to the frame and a fourth end pivotably coupled to the second draft link. The first and second draft links are pivotable relative to one another. The first and second linear actuators are independently actuatable to a plurality of lengths to pivot the first and second draft links relative to one another.

According to a third embodiment, the present invention provides a hitch assembly for a work vehicle which includes a first draft link adapted to be pivotably coupled to the work vehicle, a second draft link adapted to be pivotably coupled to the work vehicle, at least one actuator coupled to at least one of the first and second draft links, at least one sensor configured to generate at least one position signal indicative of a position of at least of the first and second draft links and a control circuit coupled to the at least one sensor. The first and second draft links pivot relative to one another. The at least one actuator is configured to pivot at least one of the first and second draft links. The control circuit is configured to generate at least one control signal in response to the at least one position signal generated by the at least one sensor. The at least one actuator pivots one of the first and second draft links relative to the other of the first and second draft links in response to the at least one control signal.

DETAILED DESCRIPTION OF THE PREFERRED EMBODIMENTS

Figure 1:
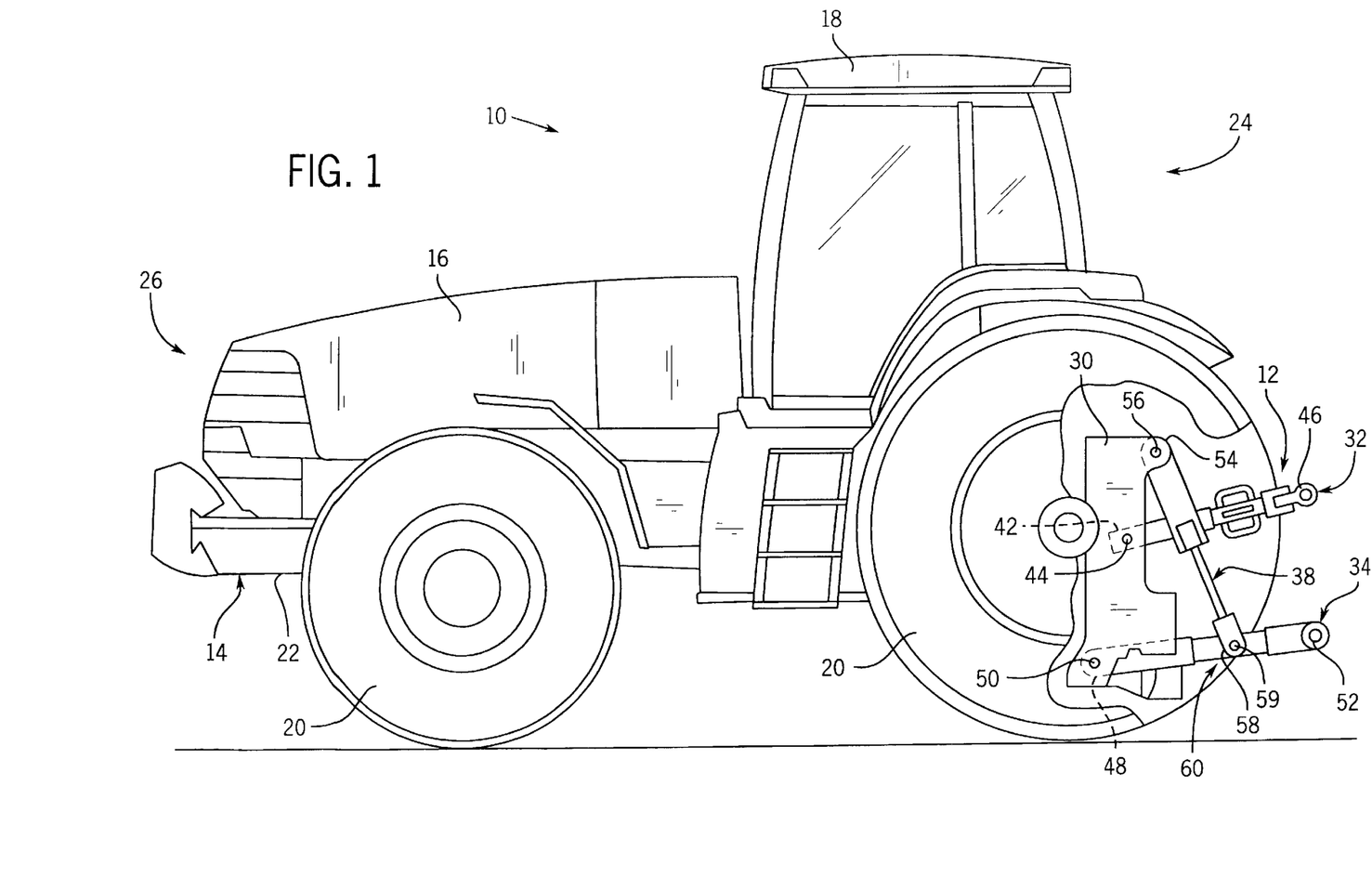
FIG. 1 is a side elevational view of a work vehicle including an exemplary hitch assembly of the present invention.

FIG. 1 is a side elevational view of a work vehicle 10 with portions broken away to illustrate hitch assembly 12. Work vehicle 10 preferably comprises a tractor having a chassis 14 supporting engine 16, operator station 18 and the remaining components of work vehicle 10 including the transmission, hydraulic system and other conventionally known components (not shown). Although chassis 14 is illustrated as including wheels 20 supporting frame 22, chassis 14 may alternatively include alternative ground engaging motive members, such as tracks, for supporting frame 22.

As generally shown by FIG. 1, hitch assembly 12 is secured to work vehicle 10 at rear end 24. Alternatively, hitch assembly 12 may be coupled to work vehicle 10 at front end 26. Hitch assembly 12 generally includes support or frame 30, upper or center link 32, lower or draft links 34, 36 (shown in FIGS. 3 and 4), linear actuator 38 and linear member 40 (shown in FIGS. 3 and 4). Frame 30 comprises a rigid stationary structure mounted to frame 22 of chassis 14 at rear end 24 and is configured to support center hitch link 32, draft links 34, 36, linear actuator 38 and linear member 40. In lieu of being mounted to frame 22, frame 30 may be integrally formed as part of frame 22. Furthermore, frame 30 may have a variety of alternative shapes and configurations depending upon the work vehicle in which hitch assembly 12 is employed, the location of hitch assembly 12 and the expected loads for hitch assembly 12. For example, frame 30 may alternatively be configured for being mounted on rear axle carriers or a rear differential housing of work vehicle 10. Frame 30 may also be alternatively configured similar to the brackets illustrated and described in U.S. Pat. No. 5,601,146 entitled "Hitch Assembly for a Tractor" which issued Feb. 11, 1997 and which is presently assigned to Case Corporation, the full disclosure of which is hereby incorporated by reference. In addition, although frame 30 is illustrated as a single member, frame 30 may alternatively be composed of several distinct members mounted or otherwise affixed adjacent to one another.

Center link 32 extends above and between draft links 34, 36 and preferably has an adjustable length. Center link 32 has a first end 42 pivotably secured to frame 30 about axis 44 and a second end 46 configured for being coupled to an implement, either directly or indirectly via a conventionally known hitch coupler (not shown). Center link 32 serves to stabilize the implement.

Draft links 34 extend from frame 30 on opposite sides of center link 32. Each of draft links 34, 36 includes a first end 48 pivotally coupled to frame 30 for rotation about axis 50 and a second opposite end 52 configured for being coupled to an implement (not shown), either directly or indirectly via a conventionally known hitch coupler (not shown). Each of draft links 34, 36 are independently pivotable about axis 50 relative to one another.

Linear actuator 38 extends between frame 30 and draft link 34. Linear actuator 38 includes a first end 54 pivotally coupled to frame 30 for rotation about axis 56 and a second end 58 pivotally coupled to draft link 34 for rotation about axis 59. Linear actuator 38 is configured to linearly extend and retract under power supplied by work vehicle 10 in response to control signals as described in greater detail hereafter. As a result, linear actuator 38 pivots draft link 34 relative to draft link 36. Because linear actuator 38 pivots draft link 34 about axis 50 relative to draft link 36 under power, hitch assembly 12 is simpler and easy to use since the operator no longer needs to manually adjust turn buckles or other manually adjustable devices. Moreover, because linear actuator 38 replaces the previously required rocker or rocker shaft, rocker shaft actuators and lift links, hitch assembly 12 occupies less space, is easier to assemble and is less expensive to manufacture. In the exemplary embodiment, linear actuator 38 comprises a conventionally known hydraulic cylinder and piston assembly. As will be appreciated, linear actuator 38 may alternatively comprise alternative linear actuators which are driven either mechanically, hydraulically, pneumatically or electrically.

Figure 3:
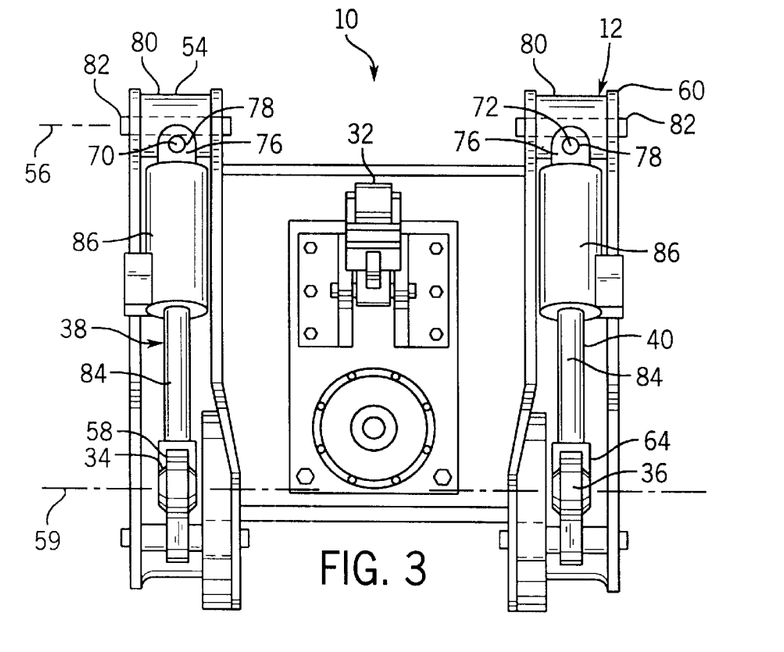
FIG. 3 is a rear elevational view of the hitch assembly of FIG. 2 depicting the draft links extending at identical angular positions.
Figure 4:
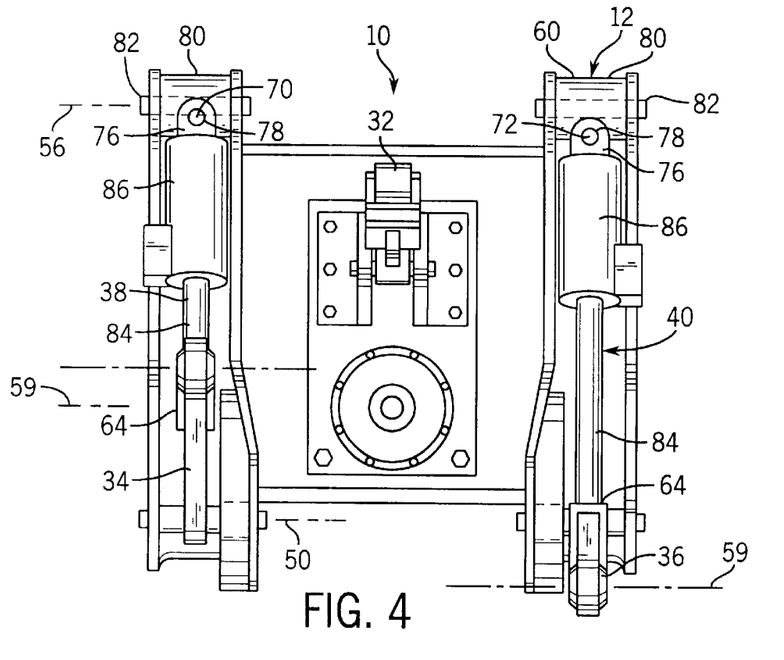
FIG. 4 is a rear elevational view of the hitch assembly of FIG. 3 depicting the draft links angularly adjusted relative to one another.

As best shown by FIGS. 3 and 4, linear member 40 extends between frame 30 and draft link 36. Linear member 40 has a first end 60 pivotally coupled to frame 30 for rotation about axis 56 and a second end 64 pivotally coupled to draft link 36 about axis 66. Linear member 40 supports draft link 36 relative to frame 30 and relative to draft link 34. In the exemplary embodiment, linear member 40 comprises a linear actuator configured for being extended and retracted to a plurality of different lengths to pivot draft link 36 about axis 50 relative to draft link 34. As a result, both draft links 34 and 36 may be independently pivoted relative to one another. Although less desirable, linear member 40 may alternatively comprise a linear member which does not have an adjustable length or which merely possesses a manually adjustable length. In the exemplary embodiment, linear member 40 preferably comprises a conventionally known hydraulic cylinder and piston assembly.

As best shown by FIGS. 3 and 4, linear actuator 38 and linear member 40 are each additionally pivotably coupled to frame 30 for rotation about axes 70, 72, respectively, to accommodate sway. In the exemplary embodiment, each of the linear actuator 38 and linear member 40 is configured to provide three degrees of movement at at least one of ends 54, 58 and 60, 64 to enable draft links 34 and 36 to be adjusted for alignment and connection with an implement or a quick hitch coupler (not shown). In the exemplary embodiment shown in FIGS. 3 and 4, ends 54 and 60 of linear actuator 38 and linear member 40 include a first pivotal joint, preferably in the form of a U-bracket or trunion 76, which is pivotally pinned by pin 78 to a joint, preferably in the form of a U-bracket 80 which is pivotally pinned to frame 30 by pin 82. As a result, pin 78 enables linear actuator 38 and linear member 40 to pivot about axes 70 and 72, respectively, while pins 82 enable linear actuator 38 and linear member 40 to pivot about axis 56. In the exemplary embodiment, each of linear actuator 38 and linear member 40 additionally includes a piston and rod assembly 84 which is rotatable relative to a corresponding cylinder 86 to provide a third degree of movement. As will be appreciated, various alternative structures and mechanisms may be utilized to provide linear actuator 38 and linear member 40 with three degrees of freedom. For example, trunions 76 may alternatively be threadably secured to cylinder 86 to provide actuator 38 and member 40 with a third degree of movement. Various other universal joint structures may also be employed. Although less desirable, each of actuator 38 and member 40 may alternatively be provided with fewer than three degrees of movement.

Figure 2:
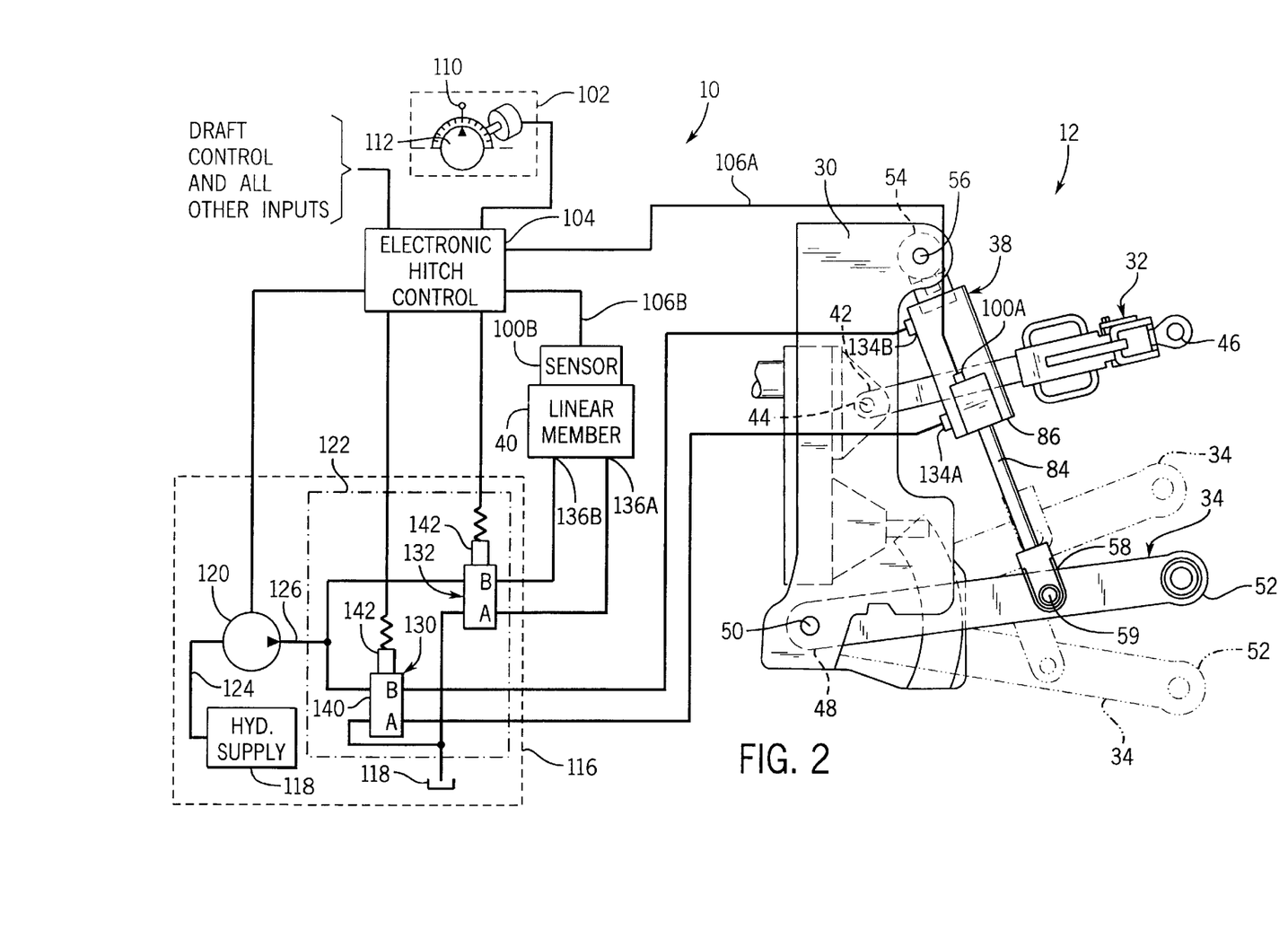
FIG. 2 is an enlarged schematic illustration of the hitch assembly of FIG. 1 depicting draft links being raised and lowered in unison with one another.

FIGS. 2–4 illustrate draft links 34 and 36 being pivoted in unison with one another and being pivoted relative to one another by linear actuator 38 and linear member 40. FIG. 2 illustrates hitch assembly 12 in greater detail. As shown by FIG. 2, hitch assembly 12 additionally includes sensors 100A, 100B, operator input 102 and electronic hitch control 104. Because linear member 40 and sensor 100B are substantially structurally identical to linear actuator 38 and sensor 100A in the exemplary embodiment, linear member 40 and sensor 100B are schematically illustrated for purposes of illustration. Sensors 100A and 100B are coupled to linear actuator 38 and linear member 40 and are configured to generate independent signals indicative of positions of linear actuator 38 and linear member 40, respectively. In particular, sensors 100A and 100B sense the respective lengths of linear actuator 38 and linear member 40 which correspond to respective angular positions of draft links 34 and 36 about axis 50. Sensors 100A, 100B then generate individual signals indicative of the sensed lengths and transmit the generated signals to electronic hitch control 104 via electrical connections 106A, 106B. In the exemplary embodiment, sensors 100A and 100B each comprise a conventionally known linear transducer mounted to linear actuator 38 and linear member 40 in a conventionally known manner. As will be appreciated, various alternative sensors may be employed for sensing and generating signals indicative of the linear length of linear actuator 38 and linear member 40. Moreover, in lieu of including sensors to sense the linear length or position of linear actuator 38 and linear member 40, hitch assembly 12 may alternatively include sensors that directly sense the angular positions of draft links 34 and 36 about axis 50 and generate signals indicative of such angular positions which are then transmitted to electronic hitch control 104. For example, each of draft links 34, 36 may be provided with a conventionally known rotary potentiometer proximate axis 50. Hitch assembly 12 may further alternatively include a rotary potentiometer proximate at either or both of axes 56 and 59 to determine the angular positions of draft links 34, 36.

Operator input 102 is electronically coupled to electronic hitch control 104 and is configured in a conventionally known manner to generate operator control signals based upon operator manipulation of control 110. The operator control signals are transmitted to electronic hitch control 104, whereby electronic hitch control actuates linear actuator 38 and linear member 40 based upon these signals. In the exemplary embodiment, operator input 102 additionally includes a display 112 configured to indicate to the operator the current operator input for the positions of draft links 34 and 36 corresponding to the desired lengths of linear actuator 38 and linear member 40, respectively. In the exemplary embodiment, display 112 comprises an analog display. Alternatively, display 112 may comprise a digital display. Alternatively or additionally, input 102 may include a display depicting the actual positions of draft links 34 and 36 as indicated by the signals generated by sensors 100A and 100B which are transmitted to input 102 by electronic hitch control 104. In the exemplary embodiment, operator input 102 is located at operator station 18 (shown in FIG. 1), preferably within the cab of work vehicle 10. As a result, input 102 enables the operator to adjust and level the position of draft links 34, 36 relative to one another without having to exit operator station 18. Although less desirable, operator input 102 may be provided at various alternative locations on work vehicle 10.

Electronic hitch control 104 comprises a control circuit coupled to sensors 100A, 100B, operator input 102 and various other inputs of work vehicle 10 such as conventionally known draft control. Electronic hitch control 104 is further coupled to linear actuator 30 and linear member 40, indirectly, via valve assembly 122. The control circuit of electronic hitch control 104 is configured to generate a control signal in response to the position signals from sensors 100A, 100B and the input signals from input control 102. Electronic hitch control 104 preferably utilizes draft control signals and other inputs such as raise and lower inputs. The control signal generated by electronic hitch control 104 causes linear actuator 38 and linear member 40 to extend or retract to thereby adjust the angular positions of draft links 34 and 36 about axis 50.

As best shown in FIG. 2, linear actuator 38 preferably comprises a hydraulic cylinder assembly. Linear member 40 also preferably comprises a substantially identical hydraulic cylinder piston assembly. Accordingly, linear actuator 38 and linear member 40 are each powered by a hydraulic supply or power system 116. Hydraulic power system 116 generally includes hydraulic supply or reservoir 118, hydraulic pump 120 and valve assembly 122. Hydraulic supply or reservoir 118 is conventionally known and stores a supply of hydraulic fluid utilized by work vehicle 10. Hydraulic reservoir 118 is fluidly coupled to pump 120 via hydraulic conduit or line 124.

Pump 120 comprises a conventionally known hydraulic fluid pump fluidly or hydraulically coupled to hydraulic reservoir 118 and valve assembly 122 and electronically coupled to electronic hitch control 104. In response to control signals from electronic hitch control 104, pump 120 displaces hydraulic fluid from reservoir 118 to supply pressurized fluid to valve assembly 122 via hydraulic line 126.

Valve assembly 122 is fluidly coupled between pump 120 and each of linear actuator 38 and linear member 40. Valve assembly 122 is further electronically coupled to electronic hitch control 104. As best shown by FIG. 2, valve assembly 122 includes valves 130 and 132. Valve 130 is electronically coupled to electronic hitch control 104 and is configured to transmit or regulate the flow of pressurized hydraulic fluid from pump 120 to actuation ports 134A, 134B of linear actuator 38 to thereby regulate the extension and retraction of linear actuator 138. Similarly, valve 132 is configured to transmit or regulate the flow of pressurized hydraulic fluid from pump 120 to actuation ports 136A and 136B to control the extension and retraction of linear member 40. In the exemplary embodiment, each of valves 130, 132 comprises a conventionally known spool 140 and a conventionally known solenoid 142 coupled to the spool 140. Spools 140 include multiple pre-configured fluid passages therethrough for channeling hydraulic fluid depending upon the particular position of the spool. Solenoids 142 are electronically connected to hitch control 144 and actuate spools 140 between the various positions in response to control signals from hitch control 104. Alternatively, spools 140 may be actuated between the various positions by various other linear actuating mechanisms which rely upon mechanical, electrical, pneumatic or hydraulic power.

In operation, sensors 100A, 100B sense the lengths of linear actuator 38 and linear member 40 which corresponds to the angular positions of draft links 34 and 36, respectively. Sensors 100A and 100B generate position signals which are then transmitted to electronic hitch control 104. Operator input 102 allows the operator to adjust the present level of draft links 34 and 36 by manipulation of control 110. In response to manipulation of control 110, operator input 102 generates input signals which are transmitted to electronic hitch control 104. Electronic hitch control 104 generates control signals based upon the position signals and the input signals. These control signals are transmitted to valve assembly 122, and in particular, valves 130 and 132. In response, valves 130 and 132 regulate the flow of pressurized hydraulic fluid to linear actuator 38 and linear member 40 to adjust the lengths of linear actuator 38 and linear member 40 to also adjust the angular positions of draft links 34 and 36, respectively.

As shown by FIG. 2, both draft links 34 and 36 may be simultaneously raised and lowered in unison with one another while maintaining the same relative angular positions with respect to one another. As a result, hitch assembly 12 may be utilized to raise and lower an implement attached thereto without requiring a rocker shaft or an additional actuator to actuate the rocker shaft. As shown by FIGS. 3 and 4, hitch assembly 12 may also non-uniformly adjust the axial length of linear actuator 38 and linear member 40 to correspondingly non-uniformly adjust the angular positions of draft links 34 and 36, respectively, relative to one another. As a result, draft links 34, 36 may be adjusted relative to one another for alignment and coupling to an implement or a hitch coupler, or for leveling once the implement has been secured to hitch assembly 12. Hitch assembly 12 enables this alignment and leveling to be achieved without manual adjustment of any threaded members, such as turn buckles, and enables such adjustment to be performed from operator station 18 without the operator ever having to leave operator station 18. Thus, hitch assembly 12 provides a draft link adjustment mechanism which enables easy and inexpensive adjustment of draft links for attachment to an implement or hitch coupler and for leveling of the draft links after attachment to an implement.

The above-described hitch assembly 12 is only one exemplary embodiment. The various alternative configurations are also contemplated. For example, although power system 116 is illustrated as employing valves 130 and 132 to regulate the flow of hydraulic fluid to linear actuator 38 and linear member 40 to thereby adjust the extension and retraction of linear actuator 38 and linear member 40, alternative mechanisms may also be employed. In lieu of pump 120 and valves 130, 132, each of linear actuator 38 and linear member 40 can be provided with a dedicated variable displacement pump coupled to and controlled by electronic hitch control 104. Moreover, in alternative embodiments, where linear actuator 38 and linear member 40 comprise other forms of linear actuators, other power systems may be employed by hitch assembly 12. For example, linear actuator 38 may alternatively configured to be extended and retracted electrically, such as through the use of a solenoid coupled to hitch control 104. Linear actuator 38 and linear member may also be alternatively configured to be mechanically, electrically or pneumatically extended and retracted by conventionally known devices connected to electronic hitch control 104. For example, actuator 38 and member 40 may alternatively comprise electrical jackscrews. In lieu of using valves 130 and 132, valve assembly 122 may employ a single valve or additional valves to regulate the flow of hydraulic fluid to actuator 38 and member 40.

Figure 5:
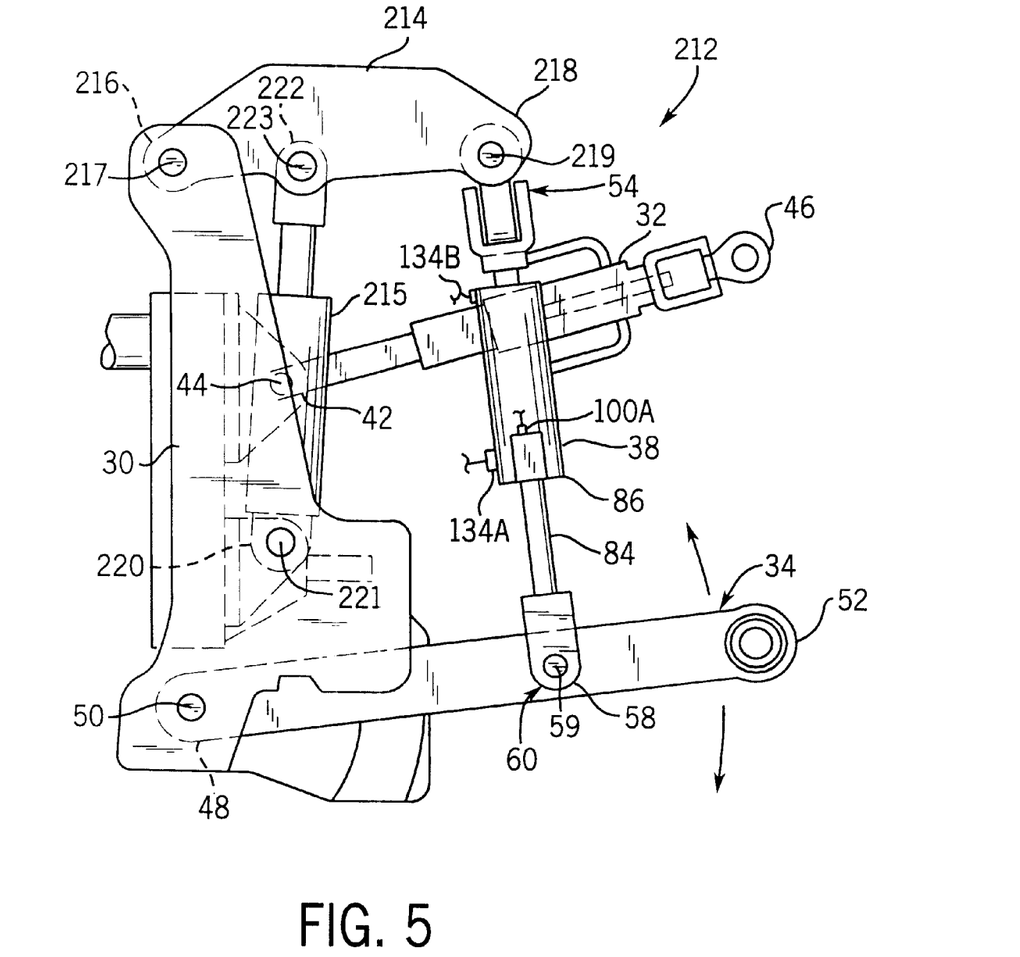
FIG. 5 is an enlarged fragmentary side elevational view of an alternative embodiment of the hitch assembly of FIGS. 1–4.

FIG. 5 is a side elevational view of hitch assembly 212, an alternative embodiment of hitch assembly 12. Hitch assembly 212 is generally identical to hitch assembly 12 except that hitch assembly 212 additionally includes rocker shaft assembly 214 and actuator 215. For ease of illustration, those remaining elements of hitch assembly 212 which correspond to hitch assembly 12 are numbered similarly. Hitch assembly 212 represents a less desirable, but advantageous advance in the art. Rocker shaft 214 comprises a conventionally known rocker shaft assembly transversely extending above lift links 34 and 36. Rocker shaft assembly 214 has a first end 216 pivotally coupled to support 30 for rotation about axis 217. Rocker shaft assembly 214 has a second end 218 pivotally coupled to end 54, 60 of linear actuator 38 and linear member 40, respectively, for rotation about axis 219.

Actuator 215 is coupled between frame 30 and rocker shaft 214 for pivoting rocker shaft 214 about axis 217. In the exemplary embodiment, actuator 215 comprises a linear actuator having a first end 220 pivotally coupled to frame 30 for rotation about axis 221 and a second end 222 pivotally coupled to rocker shaft 214 for rotation about axis 223. In the exemplary embodiment, actuator 215 comprises a hydraulic cylinder piston assembly hydraulically coupled to hydraulic power system 116 (shown in FIG. 2). Alternatively, actuator 215 may comprise other conventionally known linear actuators which rely on electrical, hydraulic or pneumatic power. Actuator 215 may also alternatively comprise a rotary actuator coupled to rocker shaft 214 for rotating rocker shaft 214 about axis 217. Although one actuator 215 is shown, hitch assembly 212 may include additional actuators pivotally coupled between frame 30 and rocker shaft 214.

In operation, linear actuator 38 and linear member 40 (shown in FIGS. 1–4) are extended and retracted relative to one another by system 116 in response to control signals from hitch control 104 (shown in FIG. 2) to adjust the angular positions of draft links 34 and 36 relative to one another for alignment with an implement or hitch coupler (not shown) or for leveling of an implement or hitch coupler once attached to draft links 34, 36 in a fashion substantially similar to that described with respect to hitch assembly 12. To raise or lower an implement directly attached to draft links 34 and 36 or indirectly attached to draft links 34 and 36 via a hitch coupler, actuator 215 is extended or retracted by power system 116 to pivot rocker shaft 214 about axis 217. Because linear actuator 38 and linear member 40 link rocker shaft 214 and draft link 34, 36, respectively, pivoting of rocker shaft 214 simultaneously raises or lowers draft links 34 and 36 in unison with one another. Hitch assembly 212 is viewed as less desirable since it requires additional components such as rocker shaft 214 and linear actuator 215. However, hitch assembly 212 is advantageous in that it enables draft links 34 and 36 to be adjusted relative to one another without manual adjustment of threaded members, such as turn buckles, and further allows draft links 34 and 36 to be adjusted relative to one another without requiring the operator to leave operator station 18 (shown in FIG. 1).

What is claimed is:

1. A hitch assembly for a work vehicle, the hitch assembly comprising:

a first draft link adapted to be pivotably coupled to the work vehicle;

a second draft link adapted to be pivotably coupled to the work vehicle, wherein the first and second draft links are pivotable relative to one another;

a first linear actuator having a first end adapted to be pivotably coupled to the work vehicle and a second end pivotably coupled to the first draft link, wherein the first linear actuator actuates between at least three lengths including a fully extended length, a fully retracted length and at least one length therebetween;

a linear member having a third end adapted to be pivotably coupled to the work vehicle and a fourth end pivotably coupled to the second draft link, wherein the first linear actuator is actuatable to different lengths to pivot the first draft link relative to the linear member;

a first sensor configured to generate a first signal indicative of the at least three lengths of the first linear actuator; and a control circuit coupled to the first sensor and configured to generate a control signal in response to the first signal, wherein the linear actuator actuates in response to the control signal.

2. The hitch assembly of claim 1 wherein the first linear actuator comprises a cylinder and piston assembly.

3. The hitch assembly of claim 2 wherein the first linear actuator is selected from the group including:
a hydraulic cylinder and piston assembly, an electrically powered jackscrew and a hydraulically powered jackscrew.

4. The hitch assembly of claim 1 wherein the first sensor comprises a linear transducer.

5. The hitch assembly of claim 1 including a rocker shaft adapted to be coupled to the vehicle, wherein the first and third ends of the first linear actuator and the linear member, respectively, are pivotably coupled to the rocker shaft.

6. The hitch assembly of claim 5 including a second linear actuator having a fifth end adapted to be coupled to the vehicle and a sixth end pivotably coupled to the rocker shaft, wherein the second linear actuator pivots the rocker shaft relative to the vehicle.

7. The hitch assembly of claim 6 including:
a second sensor configured to generate a second signal indicative of a position of the second linear actuator; and
a control circuit coupled to the first sensor and the second sensor and configured to generate a control signal based upon the first and second signals, wherein at least one of the first and second linear actuators actuate in response to the control signal.

8. The hitch assembly of claim 1 wherein the linear member comprises a second linear actuator.

9. The hitch assembly of claim 8 were in the first and second linear actuators each comprise a cylinder and piston assembly.

10. The hitch assembly of claim 8 wherein the first and second linear actuators are each selected from the group including:
a hydraulic cylinder and piston assembly, an electrically powered jackscrew and a hydraulically powered jackscrew.

11. The hitch assembly of claim 8 including:
a first sensor configured to generate a first signal indicative of a position of the first linear actuator;
a second sensor configured to generate a second signal indicative of a position of the second linear actuator; and
a control circuit coupled to the first and second sensors and configured to generate a control signal in response to the first and second signals, wherein at least one of the first and second actuators actuates in response to the control signal.

12. The hitch assembly of claim 11 wherein the first and second sensors each comprise a linear transducer.

13. The hitch assembly of claim 12 including:
a first sensor configured to generate a first signal indicative of a position of the first linear actuator;
a second sensor configured to generate a second signal indicative of a position of the second linear actuator; and
a control circuit coupled to the first and second sensors and configured to generate a control signal in response to the first and second signals, wherein the control signals operates in a first mode in which the control circuit generates a control signal which causes the first and second linear actuators to pivot the first and second draft links relative to one another and a second mode in which the control circuit generates a control signal to pivot the first and second draft links while maintaining positions of the first and second draft links relative to one another.

14. The hitch assembly of claim 9 including a frame adapted to be stationarily fixed to the work vehicle, wherein the first and third ends of the first and second linear actuators are pivotally coupled to the frame.

15. The hitch assembly of claim 8 including a rocker shaft adapted to be coupled to the vehicle, wherein the first and third ends of the first and second actuators, respectfully, are pivotably coupled to the rocker shaft.

16. The hitch assembly of claim 15 including a third linear actuator having a fifth end adapted to be pivotably coupled to the work vehicle and a sixth end pivotally coupled to the rocker shaft, wherein actuation of the third linear actuator pivots the rocker shaft relative to the work vehicle.

17. The hitch assembly of claim 1 including an upper hitch link adapted to the pivotably coupled to the work vehicle.

18. A hitch assembly for a work vehicle, the hitch assembly comprising:
a frame adapted to be stationarily coupled to the work vehicle;
a first draft link adapted to be pivotably coupled to the work vehicle;
a second draft link adapted to be pivotably coupled to the work vehicle, wherein the first and second draft links are pivotable relative to one another;
a first linear actuator having a first end pivotably coupled to the frame and a second end pivotably coupled to the first draft link; and
a second linear actuator having a third end pivotably coupled to the frame and a fourth end pivotably coupled to the second draft link, wherein the first and second linear actuators are independently actuatable to a plurality of lengths to pivot the first and second draft links relative to one another;
a first sensor configured to generate a first signal indicative of a length of the first linear actuator other than a fully retracted length and a fully extended length;
a second sensor configured to generate a second signal indicative of a length of the second linear actuator other than a fully retracted length and a fully extended length; and
a control circuit coupled to the first and second sensors and configured to generate a control signal in response to the first and second signals, whereby at least one of the first and second linear actuators pivot at least one of the first and second draft links in response to the control signal.

19. The hitch assembly of claim 18 wherein the control circuit selectively operates in a first mode and in a second mode, wherein the first and second linear actuators pivot the first and second draft links relative to one another in response to the control signal generated by the control circuit in the first mode and wherein the first and second linear actuators pivot the first and second draft links while maintaining the first and second draft links in positions relative to one another in response to the control signal generated by the control circuit in the second mode.

20. A hitch assembly for a work vehicle, the hitch assembly comprising:

a first draft link adapted to be pivotably coupled to the work vehicle;

a second draft link adapted to be pivotably coupled to the work vehicle, wherein the first and second draft links pivot relative to one another;

at least one actuator coupled to at least one of the first and second draft links and configured to pivot at least one of the first and second draft links between a fully raised position and a fully lowered position;

at least one sensor configured to generate at least one position signal indicative of a position of at least one of the first and second draft links other than a fully raised position and a fully lowered position; and a control circuit coupled to the at least one sensor and configured to generate at least one control signal in response to the at least one position signal, wherein the at least one actuator pivots one of the first and second draft links relative to the other of the first and second draft links in response to the at least one control signal.

21. The hitch assembly of claim 20 including:

a rocker shaft pivotably coupled to the at least one actuator and adapted to be pivotably coupled to the work vehicle; and a rocker shaft actuator having a first end pivotably coupled to the rocker shaft and a second end adapted to be pivotably coupled to the work vehicle, wherein actuation of the rocker shaft actuator pivots the rocker shaft.

22. The hitch assembly of claim 20 including:

a frame adapted to be stationarily coupled to the work vehicle, wherein the at least one actuator is pivotably coupled to the frame.

23. The hitch assembly of claim 20 wherein the at least one actuator pivots both the first and second draft links to maintain positions of the first and second draft links relative to one another in response to the at least one control signal.

* * * * *